United States Patent [19]

Jenkins et al.

[11] Patent Number: 4,914,898
[45] Date of Patent: Apr. 10, 1990

[54] V-BELT GUIDE

[75] Inventors: Michael J. Jenkins, Milwaukee; Jack E. Arfstrom, Beaver Dam, both of Wis.

[73] Assignee: Deere & Company, Moline, Ill.

[21] Appl. No.: 344,193

[22] Filed: Apr. 27, 1989

[51] Int. Cl.⁴ .............................................. A01D 35/26
[52] U.S. Cl. ..................................... 56/15.2; 56/13.6; 56/15.8
[58] Field of Search ...................... 56/15.1, 15.2, 15.3, 56/15.6, 15.8, 15.9, 16.2, 16.3, 13.6; 474/101, 102

[56] References Cited

U.S. PATENT DOCUMENTS

| | | | |
|---|---|---|---|
| 2,862,343 | 12/1958 | Wood | 56/13.6 |
| 3,263,406 | 8/1966 | Hanson et al. | 56/13.6 X |
| 3,543,490 | 12/1970 | Erickson | 56/13.7 |
| 3,680,292 | 8/1972 | McCanse | 56/15.8 |
| 4,102,114 | 8/1976 | Estes et al. | 56/15.2 |
| 4,429,515 | 2/1984 | Davis et al. | 56/13.6 X |

Primary Examiner—Thuy M. Bui

[57] ABSTRACT

A V-belt guide is provided for the drive belt of a vehicle-implement combination wherein the implement is capable of vertical up and down floating movement relative to the vehicle. The guide is positioned above the strands of the belt, just ahead of the drive pulley, and serves to restrict the angle at which the belt strands can enter into and exit from the drive pulley. The guide takes the form of a plate having a gently curving surface around which the belt is guided into or out of the drive pulley. Vertically projecting members are attached to the guide plate and restrict excessive lateral movement of the belt strands.

11 Claims, 2 Drawing Sheets

U.S. Patent    Apr. 10, 1990    Sheet 1 of 2    4,914,898

V-BELT GUIDE

FIELD OF THE INVENTION

The present invention relates generally to a vehicle-implement combination wherein the implement is powered by a V-belt and is capable of vertical movement or float with respect to the vehicle. More particularly it relates to a guide for controlling the V-belt's angle of entry into and exit out of the vehicle's drive pulley as the vehicle-implement combination moves over uneven ground and the implement floats.

BACKGROUND OF THE INVENTION

Rotary mowers and similar implements are commonly mounted in front of, under, or behind their towing vehicles. Typically the implements are pivotally connected to the vehicle to allow them to follow the contour of the ground and are powered by belt drive arrangements extending from a drive pulley carried on the vehicle to a driven pulley or pulleys mounted on the implement.

As these implements are moved over uneven ground, their pivotal connection with the towing vehicle permits them to rise and fall or "float" relative to their towing vehicle. When the implement "floats", its driven pulley and the V-belt trained around it will also rise or fall with respect to the drive pulley carried on the vehicle. Accordingly the belt will enter and exit the generally horizontal drive pulley at an angle above or below horizontal, thereby possibly causing it to be damaged as it twists into and out of the pulley grooves.

Such variation in the angle of entry into or out of the groove of the drive sheave will cause the V-belt to be tensioned unevenly across its band of cords. The cords provide strength to the belt and when overtensioned can become weakened or break. When the cords have been weakened, the life of the belt is reduced. If the cords break, the belt may immediately fail.

In an attempt to improve the alignment of belts used on "floating" implements with the drive sheave, pulleys and conical rollers have been provided above the belts, just ahead of their entry into and exit out of the drive pulley. While these pulleys and rollers have served to guide the belts into and out of the drive pulley groove, the belt is required to follow the periphery of the roller on pulley, which has a very small radius. Consequently, these pulleys and rollers tension the radially outermost cords of the belt to a greater degree and can cause them to weaken or fracture.

SUMMARY OF THE INVENTION

It is therefore an object of the present invention to prevent such tensioning of the cords in the V-belts used between floating implements and their drive vehicle.

More specifically, there is provided a V-belt guide that trains the belt in its vertical dimension around an arc of a relatively large radius thereby minimizing the bending of the belt across its band of cords.

To provide the relatively large bending radius, a plate rather than a roller or pulley is used. The plate is positioned just ahead of the drive pulley and extends above and across the entering and exiting belt strands. Its curved surface or arc is oriented transversely to the path of the belt strands and serves to minimize the friction of the belt on the plate.

The guide plate further includes a leading transverse edge with a more severely curved arc that also has its axis along a generally transversely extending line. The more severely radiused edge serves to prevent initial contact between the belt and the flat leading edge of the plate.

The guide plate is further provided with downwardly projecting rods which serve to confine the belt strands laterally and assist in controlling belt "whip" which occasionally occurs with belts of longer lengths.

The generally flat plate requires little space beneath the vehicle and can easily be fitted to its undercarriage. No lower guide plate is required beneath the belt strands in the preferred embodiment since the downward float of the implement and its drive belt is limited to less than the maximum recommended angles of belt entry into and exit from the drive sheave.

With the present invention reduced damage is encountered by belt cords resulting in improved belt life and reduced machine downtime for belt maintenance.

DESCRIPTION OF THE PREFERRED EMBODIMENT

Figure 1:
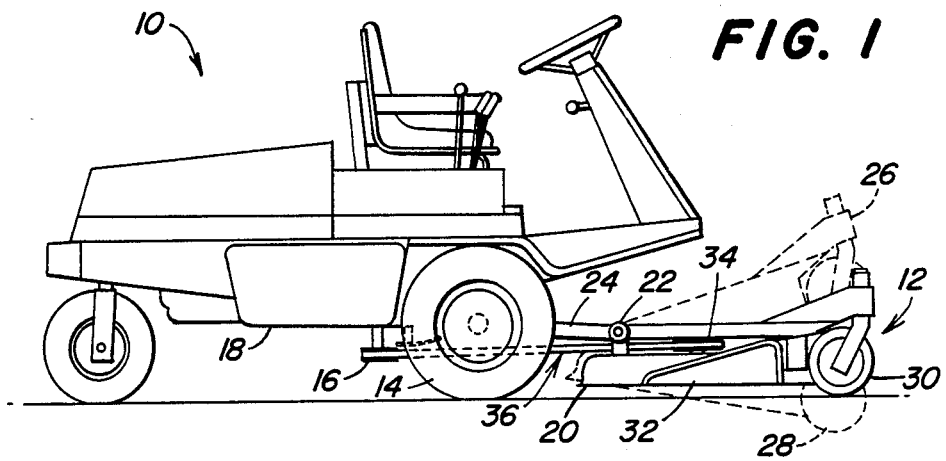
FIG. 1 is a side elevational view of the present invention utilized on a front-mounted implement. Illustrated in phantom are the vertically extreme float positions of the implement.

Referring now to the drawings and in particular FIG. 1, there is illustrated a lawn and garden tractor or vehicle 10 and a front-mounted implement 12. The particular implement illustrated is a rotary mower.

The illustrated vehicle 10 is a front-mount tractor and includes an engine (not shown) which provides the power to drive the tractor wheels 14 as well as the drive pulley 16. The drive pulley 16 is mounted on the engine crankshaft which extends beneath the engine and the vehicle's undercarriage 18.

The mower 12 has its rearward portion 20 pivotally attached at 22 to a link 24 rigidly carried by the vehicle 10. The pivotal connection 22 supports the rear portion 20 of the mower 12 and permits it to float between the vertical positions 26 and 28 partially illustrated in phantom. The mower 12 also includes a front-mounted caster wheel 30 for carrying its front portion.

The mower 12 illustrated in FIG. 1 includes a conventionally mounted blade (unshown) within the housing 32 which is carried on a shaft that has mounted on it a driven pulley 34. The mower 12 could also be equipped with several blades and driven pulleys. Trained around each driven pulley 34 of the implement 12 and the drive pulley 16 carried by the vehicle 10 is the V-belt 36.

Figure 2:
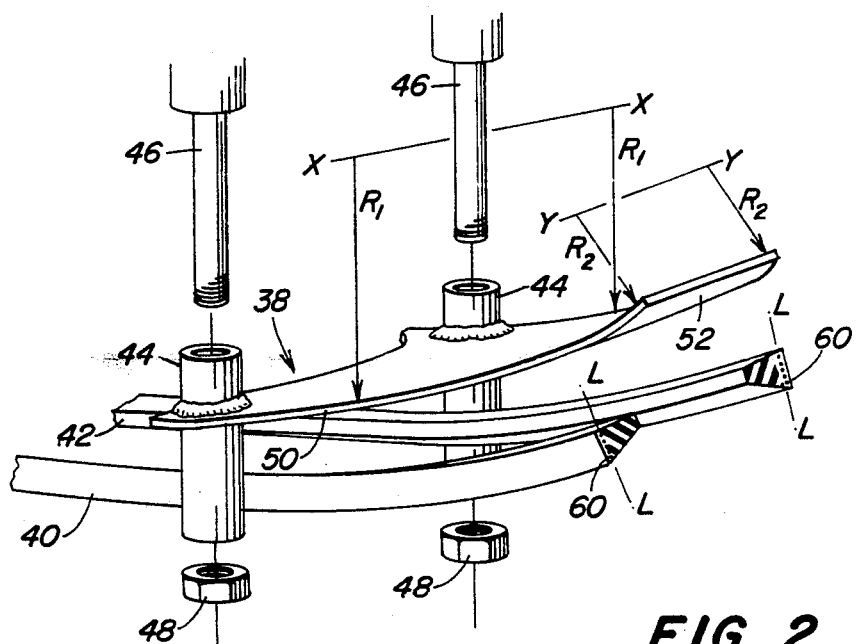
FIG. 2 is an enlarged perspective of the present invention also illustrating its mounting means and a portion of the drive belt.
Figure 3:
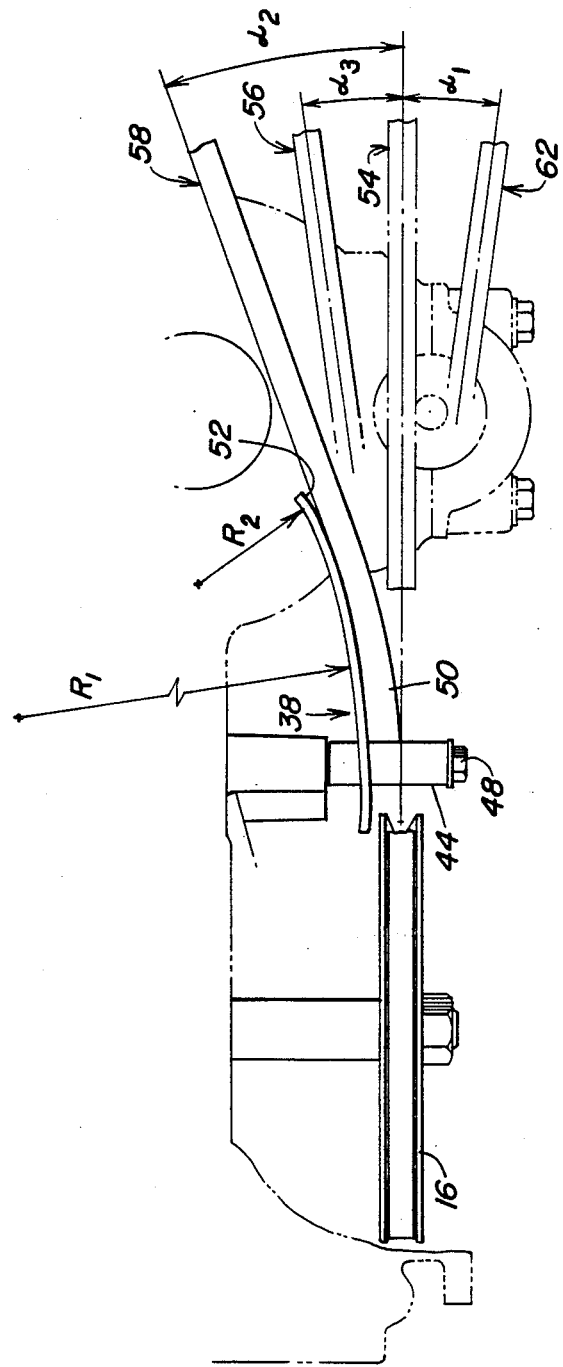
FIG. 3 is an enlarged and partial side view of the present invention illustrating also the drive pulley and various angles of V-belt entry into or exit from the drive pulley.

Looking now to FIGS. 2 and 3 which illustrate the present invention in more detail, there is found a guide plate 38 taking the form of a generally horizontal member positioned above the strands 40 and 42 of the belt just forwardly of the drive pulley 16. For purposes of discussion, the near strand, as seen in FIGS. 1 and 2, is identified by the number 40 and will be presumed to be the strand entering the drive pulley. The far strand is identified by the number 42 and will be presumed to be the strand exiting from the drive pulley. The plate or belt guiding means 38 extends generally horizontally across the incoming and outgoing strands 40 and 42 of the belt 36 and is positioned to be spaced just above the normally horizontal path of or upper edges the belt strands 40 and 42.

The plate 38 includes vertically extending and transversely spaced apart rods or sleeves 44 which receive the threaded members 46 mounted to the vehicle's undercarriage 18. Conventional nuts 48 provide the means to secure the plate 38 to the bolts 46 and the vehicle undercarriage 18.

The sleeves 44 serve the dual purpose of providing a mounting means for securing the plate 38 to the vehicle 10 and for restricting the lateral movement or whip of the belt strands 40 and 42 as may occasionally occur when longer belts are utilized. In the preferred embodiment the downwardly projecting means or sleeves 44 are spaced just laterally of each belt strand 40 and 42 and would not normally be in contact with the strands 40 and 42 during operation.

Looking now to FIG. 3 which illustrates the guide plate 38 from a side view, it will more easily be seen that the plate 38 includes a first transversely extending portion 50 formed in the shape of an arc having a radius $R_1$. At the leading edge of the plate 38 is a second transversely extending portion 52 having a more severely curved radius, that radius being defined by the line $R_2$. In the preferred form of the embodiment, $R_1$ is 260 mm and $R_2$ is 30 mm. As shown in FIG. 2 the two arcs of the plate 38 which are defined by $R_1$ and $R_2$ take the form of sections of a cylinder having their respective axis along the transversely extending lines XX and YY.

Additionally illustrated in FIG. 3 are lines which depict the path the belt would follow as the implement 12 floats between the lower and uppermost positions 28 and 26. $\alpha_1$ depicts the angle of the path the belt follows beneath a horizontal drive pulley when the implement 12 is permitted to float to its lowermost position 28 relative to the vehicle 10 $\alpha_2$ illustrates the angle of the path the belt 36 may take with respect to a horizontal drive pulley 16 when the implement 12 is in its uppermost float position 26. $\alpha_3$ illustrates the angle of the belt 36 relative to a horizontal drive pulley 16 as restricted by the plate 38.

A brief description of the operation of the invention now follows. Referring again to FIG. 1 there is illustrated the vehicle 10 and floating implement 12 with its extreme up and down float positions 26 and 28, depicted in phantom.

The belt 36 will operate in a generally horizontal orientation when the implement 12 and tractor 10 are operating on level ground. In this position the belt 36 would not normally contact the lower surface of the guide plate 38 nor the vertical guide rods 44. It would be in the horizontal position as depicted by phantom belt 54 of FIG. 3.

As the mower 12 is moved over uneven terrain such as ditches or hills, it would float to its upper position 26 and the path of the belt 36 would rise above horizontal. When the angle of the belt 36 relative to the drive pulley 16 reaches that angle depicted by $\alpha_3$ or approximately 9° in the preferred embodiment, the upper surface of the belt 36 would contact the first portion 50 of the skid plate 38 having radius $R_1$. This position of the belt in FIG. 3 is designated by the number 56.

As the implement 12 rises further and the belt 36 raises to its uppermost position, as designated by the number 58 in FIG. 3, the guide plate 38 would direct the belt at angle $\alpha_2$ around its lower surface to guide it into the pulley. Because $R_1$ provides a gently curving surface for the strands 40 and 42 of the belt 36 to be trained about as the implement 12 floats to its uppermost position, the tension across the belt 36 in its vertical dimension, illustrated by the line L—L (see FIG. 2) is minimized. Accordingly, the most lower cord 60 of the belt 36 which would be the most severely tensioned cord in the belt 36, would not be stressed to the point of damage or fracture.

When the implement 12 has moved to its uppermost position 26, the belt 36 first contacts the more severely curved second portion 52 of the guide plate 38 having the shorter radius $R_2$. The more severe radius of this front portion 52 causes the front edge of the guide plate 38 to rise above the belt 36, thereby preventing contact of the sharper leading edge of the plate 38 with the belt 36 and minimizing the likelihood of cutting or abrasive damage to the belt 36.

As the implement 12 is moved over terrain which allows it to drop with respect to the vehicle 10, its belt 36 can reach the angle of entry into and exit out of the drive sheave depicted by $\alpha_1$. The position of the belt at this time would be as designated 62 in FIG. 3. This angle would be no greater than 8° below horizontal for the parts and geometry of the particular belt and drive pulley combination of the preferred embodiment. Since it is unlikely that cord damage will occur to the belt 36 until the angle exceeds approximately 9°, no lower guide plate is provided in the preferred embodiment to confine the belt strands 40 and 42.

Should the geometry of the parts of a particular vehicleimplement combination dictate the necessity, a second guide plate could be positioned below the strands 40 and 42 of the belt 36 to confine the angle of the belt entry and exit as the implement 12 floats to its lower position relative to the vehicle 10.

With the present invention, damage to belt cords when belt assumes an excessive angle of entry into or out of the drive pulley 16 is avoided. A simple and inexpensive, yet compact guide mechanism is provided to restrict the belt's entry into and out of the drive pulley 16 and avoid tensioning forces on the outer cords 60 of the V-belt. Because the belt 36 is not in constant contact with either the main guide surface of the plate 38 or the vertically and laterally placed guide rods 44, excessive wear on the belt surface is also avoided.

We claim:

1. For use in a vehicle having an engine and a generally horizontal drive pulley powered by the engine, said vehicle being adapted to have an implement connected to the vehicle, that implement having a generally horizontal driven pulley and the vertical displacement of said implement relative to the vehicle varying during operation; an endless belt adapted to be trained over the drive and driven pulleys; and belt guiding means carried by the vehicle and positioned such that it would be between the drive and driven pulleys and extend generally horizontally to the drive pulley and be spaced just above the path of the endless belt; said means adapted to contact the guide an upper edge of the belt before it enters the drive pulley and limit the entry angle of the belt into the pulley to approximately 9° from horizontal as the vertical displacement of the implement and its driven pulley would vary relative to the vehicle and the drive pulley.

2. The invention defined in claim 1 wherein the belt guiding means is spaced just above the belt as its exits from the drive pulley and is adapted to contact the guide an upper edge of the exiting belt to limit the belt's exit angle to approximately 9° from horizontal.

3. The invention defined in claim 1 wherein the belt guiding means also includes downwardly projecting means for restricting lateral movement of the belt as it enters and exits the drive pulley.

4. The invention defined in claim 1 wherein the belt guiding means is comprised of a generally horizontal plate having a portion in the form of an arc centered about a transversely extending axis.

5. The invention defined in claim 4 wherein the radius of the arc is approximately 260 mm.

6. The invention defined in claim 4 wherein the belt guiding means further includes a leading edge adjacent the arc-shaped portion, the leading edge bending upwardly away from the path of the belt.

7. A vehicle having an implement attached thereto for vertical float with respect to the vehicle, a belt drive between the vehicle and implement including a drive sheave mounted on the vehicle, a driven sheave attached to the implement, and a belt operably trained around the drive and driven sheaves, the improvement comprising:

means for directing the belt into the drive sheave when the implement floats vertically upward with respect to vehicle, including a generally horizontally disposed guide plate carried by the vehicle between the drive and driven sheaves, said plate being disposed above and proximate to the belt and including an upwardly curved portion spaced from the drive sheave, whereby the strand of belt returning from the driven sheave when the implement has floated vertically upwardly so as to exceed a predetermined angle of entry into the drive sheave will first contact the curved portion of the guide plate and thereby not exceed an entry angle into the drive sheave of approximately 9° above a line through the groove of the drive sheave.

8. The invention defined in claim 7 wherein the upwardly curving portion is comprised of a first portion shaped in the form of an elongated arc having its radius centered along a generally horizontally extending axis and a second portion adjacent the first portion which is curved and has a radius of lesser length than the first portion.

9. The invention defined in claim 7 wherein the belt directing means further includes a downwardly projecting member adapted to limit lateral movement of the belt.

10. The invention defined in claim 7 wherein the guide plate includes a section above the belt strand exiting from the drive sheave.

11. The invention defined in claim 10 wherein the section of the guide plate also includes first and second curved portions.

* * * * *

UNITED STATES PATENT AND TRADEMARK OFFICE
CERTIFICATE OF CORRECTION

PATENT NO. : 4,914,898

DATED : 10 April 1990

INVENTOR(S) : Michael J. Jenkins and Jack E. Arfstrom

It is certified that error appears in the above-identified patent and that said Letters Patent is hereby corrected as shown below:

Column 4, line 65, delete "the" (first occurrence) and insert --and--.

Column 5, line 5, delete "the" (second occurrence) and insert --and--.

Signed and Sealed this

Twenty-seventh Day of August, 1991

Attest:

HARRY F. MANBECK, JR.

Attesting Officer

Commissioner of Patents and Trademarks